(12) United States Patent
Dillon et al.

(10) Patent No.: US 6,648,366 B2
(45) Date of Patent: Nov. 18, 2003

(54) DRIVER SIDE AIR BAG WITH PARTICULATE DIVERTER

(75) Inventors: Michael R. Dillon, Gaines, MI (US); Damon N. Hewin, Detroit, MI (US); Lawrence R. Langbeen, Attica, MI (US); Brian C. Ford, Mt. Clemens, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/097,892

(22) Filed: Mar. 14, 2002

(65) Prior Publication Data

US 2003/0173760 A1 Sep. 18, 2003

(51) Int. Cl.[7] ............................................... B60R 21/24
(52) U.S. Cl. ...................................... 280/729; 280/740
(58) Field of Search ........................... 280/729, 740, 280/743.1, 743.2

(56) References Cited

U.S. PATENT DOCUMENTS

| | | | | |
|---|---|---|---|---|
| 5,249,824 A | * | 10/1993 | Swann et al. | 280/729 |
| 5,516,146 A | * | 5/1996 | Kopitzke | 280/743.1 |
| 5,573,270 A | * | 11/1996 | Sogi et al. | 280/740 |
| 5,957,485 A | * | 9/1999 | Hirai | 280/729 |
| 6,059,312 A | * | 5/2000 | Staub et al. | 280/729 |
| 6,336,659 B1 | * | 1/2002 | Corrion | 280/736 |
| 6,361,067 B1 | * | 3/2002 | Varcus et al. | 280/729 |
| 6,382,662 B1 | * | 5/2002 | Igawa | 280/729 |
| 6,478,331 B1 | * | 11/2002 | Lang | 280/729 |

FOREIGN PATENT DOCUMENTS

WO    WO 9942332 A1 *  8/1999  .......... B60R/21/16

* cited by examiner

*Primary Examiner*—Peter C. English
(74) *Attorney, Agent, or Firm*—Markell Seitzman

(57) ABSTRACT

An air bag module assembly comprising: an inflator (250) having at least one exit port (270) with a thin layer of burst material (272) blocking the at least one exit port (270), the burst material bursting forth from the exit port during an initial moment of activation of the inflator. The module including an air bag assembly comprising an inflatable first bag (20) and an inflatable second bag (70), the second bag located within the first bag, the second bag including an opening (40b) to receive the inflator (250) wherein prior to activation, opposed portions of the second bag, radially outboard of the inflator, are formed into respective flaps, which are overlaid and positioned on a top of the inflator to provide a tortuous path through which any particles can flow prior to entering into a main portion of the air bag.

6 Claims, 4 Drawing Sheets dimension a. The rear panel 24 will most probably be made
DRIVER SIDE AIR BAG WITH PARTICULATE DIVERTER

BACKGROUND AND SUMMARY OF THE INVENTION

The present invention generally relates to air bags and more particularly to driver type air bags.

Many inflators that are used to inflate a driver side air bag resemble a shortened cylinder (a small height/diameter ratio). The side wall of the cylinder includes a plurality of small exit openings through which inflation gas exits the inflator and enters into an inlet of the air bag. Inflators include a small quantity of propellant or gas generant material. To prevent moisture from entering into the propellant, most inflators wrap the propellant with a metal foil or, alternatively, adhere a metal foil to the inside surface of the inflator's side wall. This foil obscures and blocks the plurality of exit holes or exit ports, thus providing a hermetic seal.

After the propellant is ignited, inflation gas is produced within the still closed inflator. At some level of pressure, the heated inflation gasses cause the foil to burst through the exit ports, thereby permitting the inflation gas to inflate the air bag. Occasionally, that portion of the foil sealing the exit port will become airborne and be pushed into the air bag by the out rush of inflation gas. This small piece of foil, which may now be heated by the inflation gas, could possibly flow past the various heat shields typically used in a driver side air bag and might impinge on the face panel or rear panel of the driver side air bag.

In addition to the small piece of foil, certain other particulates associated with the generant or propellant may flow out of the inflator into the air bag. To lessen the amount of deployment-generated particulates, many inflators employ metal or ceramic filters. These filters are placed about and downstream of the propellant and upstream of the metal foil barrier that blocks the exit openings. In a broad sense the small piece of metal foil may be considered as another particulate, however, this type of particulate cannot be filtered by the particulate filter, which is upstream of the foil.

In the present invention, the entrapment of these foil particles is accomplished primarily by the physical interaction and characteristics of an inner flexible bag and secondarily due to the physical characteristics of a retaining ring.

It is an object of the present invention to provide an improved air bag module.

Accordingly the invention comprises: an air bag module assembly comprising: an inflator having at least one exit port with a thin layer of burst material blocking at least one exit port, the burst material bursting forth from the exit port during activation of the inflator; an air bag assembly comprising an inflatable first bag and an inflatable second bag, the second bag located within the first bag, the second bag including an opening to receive the inflator wherein prior to activation, opposed portions of the second bag, radially outboard of the inflator, are formed into respective flaps, which are overlaid and positioned on a top of the inflator to provide a tortuous path for of any particles including particles of burst material.

Many other objects and purposes of the invention will be clear from the following detailed description of the drawings.

DETAILED DESCRIPTION OF THE DRAWINGS

Figure 1:
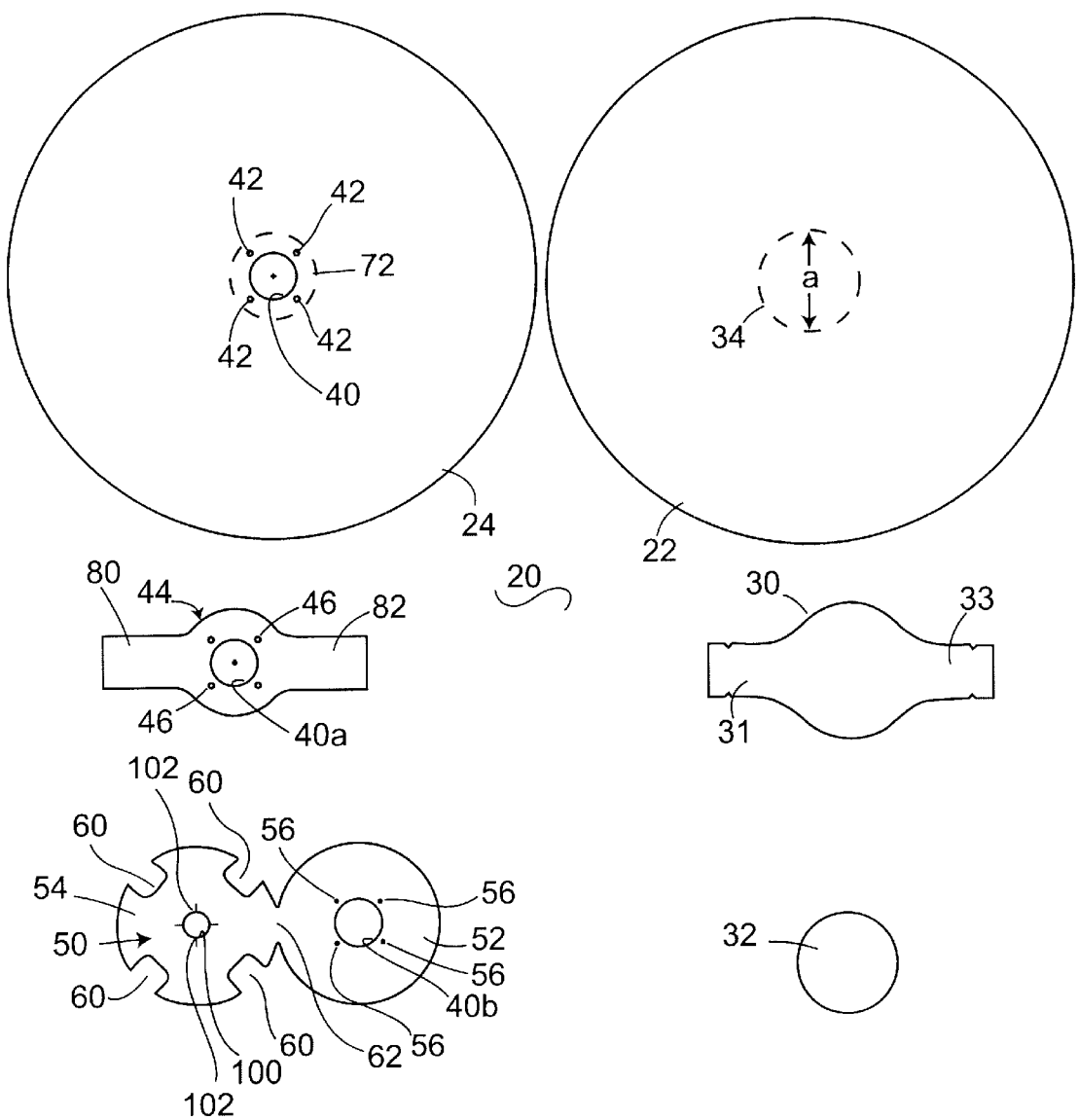
FIG. 1 shows the various components of an air bag utilizing the present invention.
Figure 2:
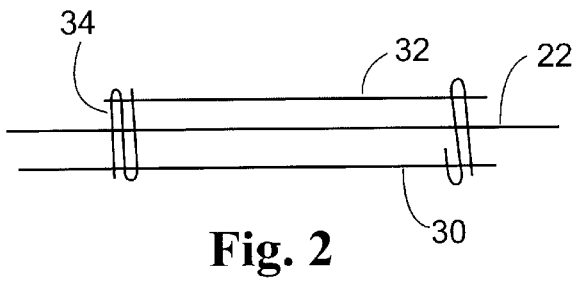
FIG. 2 diagrammatically illustrates a cross-sectional view of a face panel with various other fabric panels sewn thereon.
Figure 3:
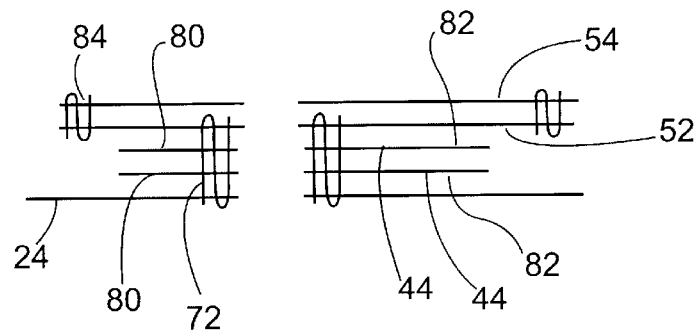
FIG. 3 diagrammatically illustrates a rear panel with a plurality of other panels of material sewn thereon.

FIG. 1 illustrates the major components of an air bag assembly 20 made in accordance with the present invention. The air bag assembly 20 includes an outer air bag having a face panel 22 and a rear panel 24. Before sewing the face and the rear panels together, a first tether portion 30 and crown reinforcement 32 are sewn to the face panel as illustrated in FIG. 3. As can be appreciated, the crown and tether are optional. The crown reinforcement is placed on one side of the face panel while the first tether portion is placed on the other side of the face panel. If the face panel is a coated material (typically woven nylon coated with silicone) the crown is attached to the uncoated side and the tether portion to the coated side. The tether portion and crown reinforcement 30 and 32 are registered one to the other and sewn together along a circular seam 34 having a diameter of dimension a. The rear panel 24 will most probably be made from the same material as the face panel but can be coated or uncoated independent of the type of material used for the face panel. The rear panel is of approximately the same diameter as that of the face panel. The rear panel, however, includes a center opening 40 and four mounting openings 42 through which are received mounting lugs or fasteners (associated with a retainer). FIG. 1 also shows one of the two identical second tether portions 44 and a one-piece panel (also called an inner bag panel) 50, which when constructed forms an inner air bag 70. Each of the second tether pieces 44 includes a second opening 40a of the same or similar diameter as opening 40 and four additional mounting openings 46. When the openings 40 and 40a are aligned, the mounting openings 42 and 46 are similarly aligned.

Figure 4:
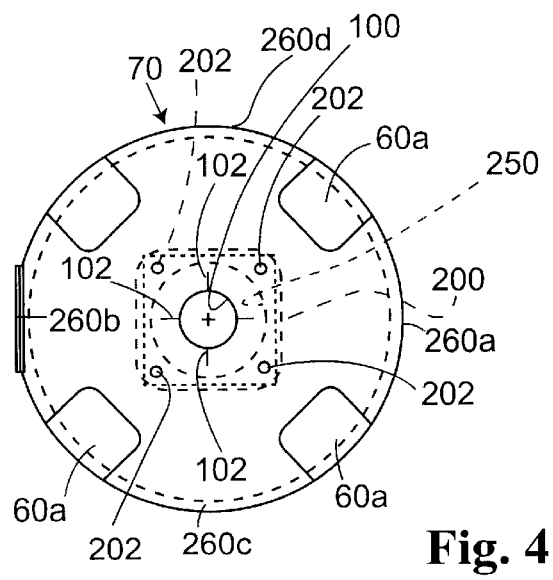
FIG. 4 is a top view showing the features of an inner bag.

The inner bag panel 50 includes a base panel portion 52 and a top panel portion 54. As can be seen in the present invention, the panel portions 52 and 54 are formed as integral parts of the inner bag panel 50, however, two separate, generally circular panels 52 and 54 can be used. The panel portion 52 is generally circular and includes a central opening 40b of substantially the same size as openings 40a and 40 and also includes four mounting openings 56. Panel portion 54 is similarly of a circular shape but includes a plurality of cutouts 60. In the present invention, four such cutouts or notches 60 are used, each of which are ninety degrees apart. As can be seen, the panel portions 52 and 54 share a common boundary generally designated by numeral 62, which enables the top panel portion 54 to be folded over the common border 62 and aligned with the bottom or base portion 52. The relationship is show in FIG. 4. Thereafter, the top panel portion 54 is sewn to the bottom panel portion 52, forming an inner bag 70. The cutouts or notches 60, in concert with the base panel 52, form four exit ports 60a (as shown in FIG. 4). The inner bag is formed after attachment to the rear panel.

The rear panel is assembled as follows. Two of the second tether portions (or members) 44 are aligned to each other and to opening 40. As can be seen, each of the second tether portions (or members) has extending legs 80 and 82, which are aligned to one another. Subsequently, the bottom panel 52 (of the inner bag panel) is laid on the two tether panels 44 and aligned with opening 40. Panel 52 and the two second tether portions 44 are each sewn together by a seam 72 as shown in FIG. 3. Subsequently, the top panel 54 is folded over the shared common border 62 and peripherally sewn to the base panel along a circular seam 84 to form the inner bag 70. As a point of clarification, any of the seams mentioned above can be singular or double (etc.) seams and will depend upon the strength needed. Additionally, if the rear panel is formed from a coated material, the tether portions 44 are attached to the coated side.

The various tether portions 30 and 44 will most probably be made of the same material used for the face and rear air bag panels 22 and 24 while the inner bag panel 50 may be of a heavier nylon-coated fabric, such as 840 denier with approximately a 24 gram per meter silicone coating. The silicone coating for the inner bag is heavier (per square meter) than that used for the face and/or rear panels (which is known in the art).

Figure 5:
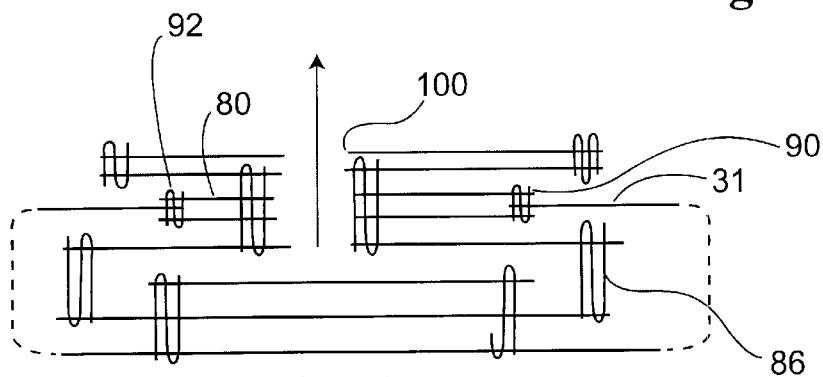
FIG. 5 diagrammatically illustrates an assembled, though inverted, air bag of the present invention.

After the various panels have been assembled to the face 22 and rear 24 panels, the face and rear panels are aligned one to the other and sewn along a peripheral seam 86 as shown in FIG. 5. Subsequently, one of the legs 31 of the face panel tether portion 30 is inserted between the two legs 82 (of the rear panel tether portions 44) and sewn thereto by seam 90. The other leg 33 is placed between the legs 80 and sewn thereto along seam 92. The general construction of the air bag in its inverted condition is shown in FIG. 5.

Reference is again made to FIGS. 1 and 4. As can be seen, the top panel 54 includes a central opening 100. In the preferred embodiment of the invention, the radius of this opening is approximately 40 mm. Extending at intervals of 90 degrees around the opening 100 is a plurality of slits 102 (the length of each slit is about 10 mm). As will be seen from the description below, the inverted air bag shown in FIG. 5 is pulled through opening 100 to place the bag in its right-side-out configuration. The slits 102 effectively increase the size of opening 100 and facilitate the pull-through of the many sewn-together panels of material.

Figure 6:
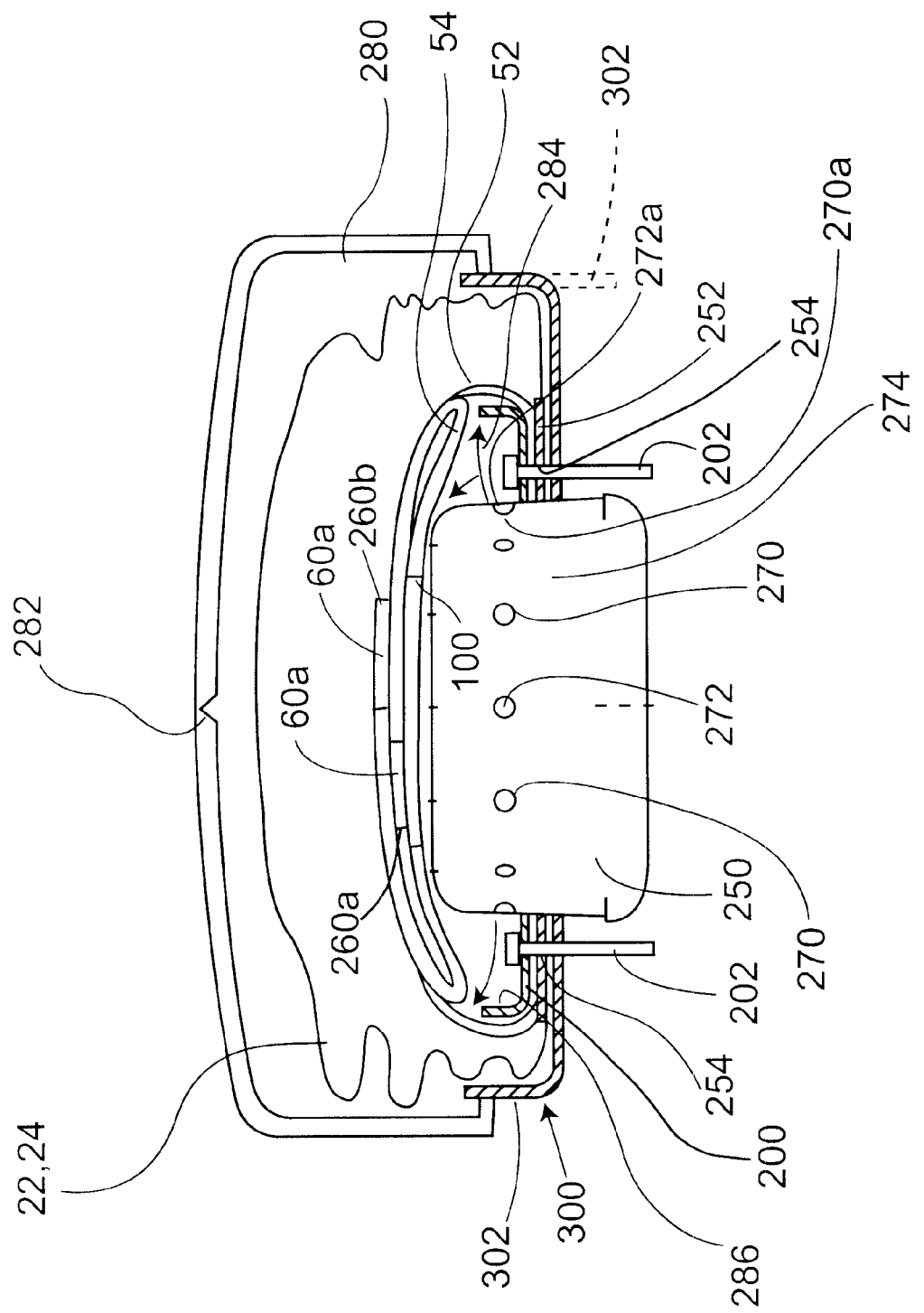
FIG. 6 is a cross-sectional view of an air bag module prior to inflation.

Reference is again made to FIG. 4, which also shows the placement of a retainer 200 within the inner bag 70. FIG. 4 is also useful as it shows the relative size of the diameter of the inner bag 70 to the length (diameter) of one of the sides of the retainer 200. After the air bag has been pulled right-side-out, the retainer 200 is inserted within opening 100 and manipulated through the slits 102. As can be seen, the retainer is generally square (but can be circular or oval) and includes four mounting bolts 202. Only two of these bolts are shown in FIG. 6. The mounting bolts are manipulated so that they pass through the one sets of aligned mounting openings 56 in panel 52, the two sets of aligned openings 46 in the two retainer portions 44, and the mounting openings 42 in the rear panel. Thereafter, an inflator 250 is secured to the mounting fasteners 202. The inflator 250 includes a flange 252 having a like number (four) of mounting openings 254, one for each mounting fastener 202. The inflator flange sandwiches the various panels of material associated with the rear panel of the air bag 20 against the lower surface of the retainer 200.

Reference is again made to FIG. 4 and more particularly to points 260a and 260b, which lie on the outer circumference of the inner bag 70. Additionally, it should be noted that the approximate relationship between the radius of the inflator and the radius of the inner bag 70 is about 3½ to 1. This oversized relationship permits the sides of the inner bag 70 to be folded over the top of the inflator 250 and overlapped one upon the other (upon the top of the inflator 250). This relationship can be seen in FIG. 6. Additionally, points 260c and 260d would achieve a similar folded-over relationship although displaced 90 degrees to the orientation of FIG. 6. Other air bag fold configurations are within the scope of the invention.

FIG. 6 also shows the plurality of exit ports 270, each of which is sealed by a tape or portion of thin burstable foil 272 that is placed behind the cylindrical or side wall 274. Additionally, two of the four openings 60a formed at the outer periphery of the bag can also be seen in FIG. 6. When the propellant inside of the inflator 250 is ignited, for the first few moments after ignition the air bag will still be folded and look as depicted in FIG. 6 with the front and rear panels 22 and 24 folded in a compact orientation and protected by a deployment cover 280 (which is diagrammatically shown). The cover 280 includes a tear seam 282, which is opened by the expanding air bag 20. The components shown in FIG. 6 comprise an air bag module. The cover is attached to a housing 300 with an upwardly raised flange 302. This housing flange 302 can also be curved downwardly (see phantom line), in which case the cover would be attached to the housing at a relatively lower location. The housing also includes four mounting openings for the fasteners 202. As the pressure within the inflator increases, the foil 272 might be dislodged by the egress of inflation gas. Assume for the moment that a quantity of foil 272a located at exit port 270a exits the inflator as generally shown by arrow 284. Even if this particulate or piece of foil is hot, it will either impact the lower or base panel 52 or the upper panel 54 (each of which is coated and acts as a heat shield) in the vicinity of the upwardly extending flange 286 of the retainer 200. As illustrated, the flange 286 extends slightly above the elevation of the exit ports 270, however, the flange could intersect or be slightly lower than the exit ports. This particle of foil will most probably become entrapped at this location, within the inner bag 70, as it loses heat and momentum.

Additionally, as the air bag continues to inflate, the inner bag will be pushed outwardly. However, with regard to the trajectory of the foil piece 272a, it will have to progress initially through the closed passage between the folded-over panels 52 and 54 and consequently, if and when it exits the opening 60a in bag 70, its temperature and momentum will be significantly decreased so even if it did lodge or impact the face or rear panels 22 and 24 respectively, no damage would be done. Additionally, the placement of opening 100 (in the top of the inner bag 70) can also be seen as it is positioned, in FIG. 6, generally atop the inflator 250 (within the inner bag in the folded state). Even if the foil particulate 270a, for example, should tend to flow underneath the top panel 54 toward the opening 100, its immediate egress through any of the plurality of openings 60a at the periphery of the inner bag 70 will be delayed because of the overlapping of the panels 52 and 54 atop the inflator and this will tend to cause the foil particle to lose temperature and momentum.

Figure 7:
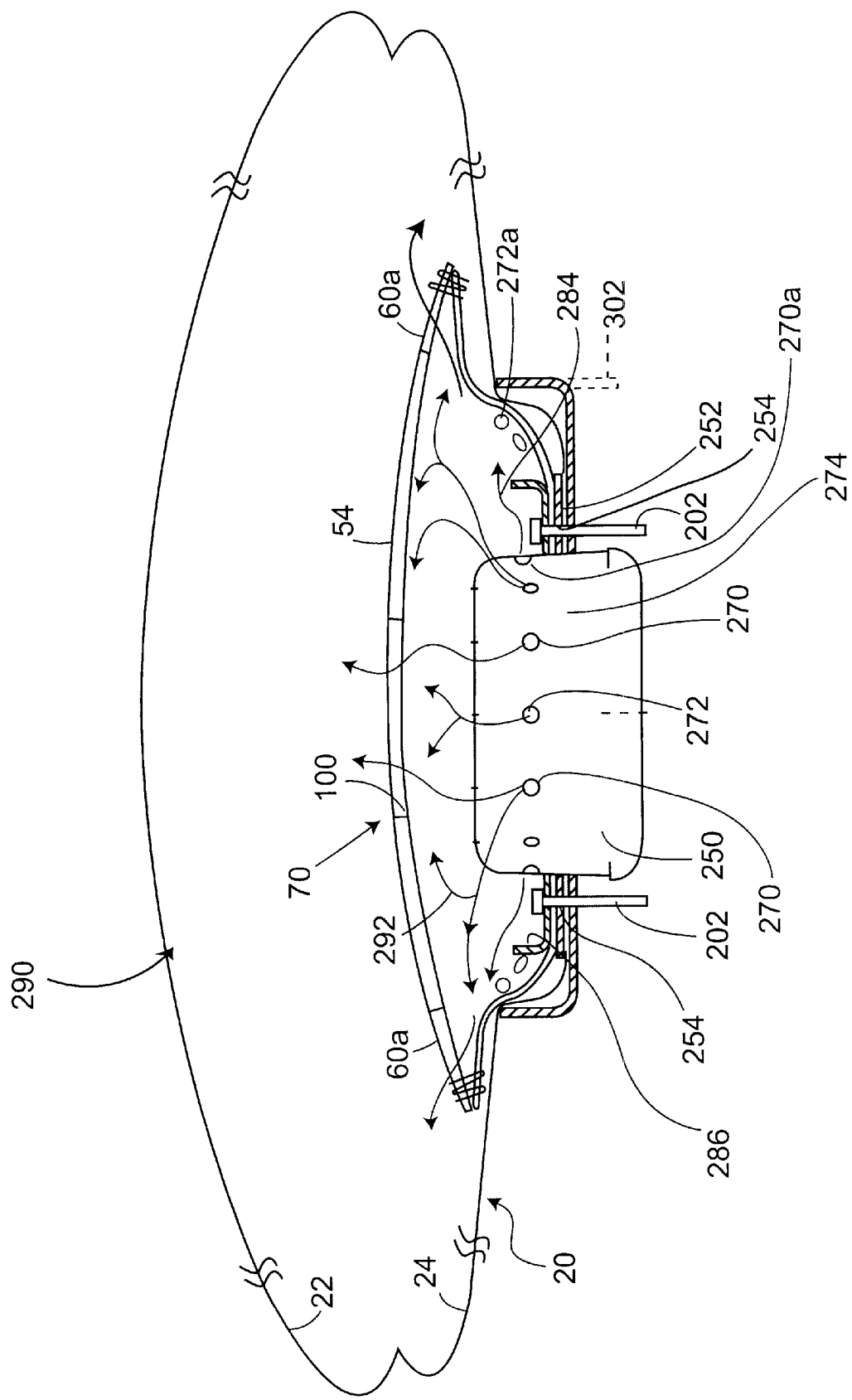
FIG. 7 shows an inner and outer air bag inflated.

Reference is briefly made to FIG. 7, which shows the inner bag 70 inflated and also shows the air bag 20 formed by the face 22 and rear 24 panels inflated. The various arrows 292 illustrate the air flow paths of the inflation gas from the various exit ports 270 to the inner bag 70 and through to the outer bag 170.

Many changes and modifications in the above-described embodiment of the invention can, of course, be carried out without departing from the scope thereof. Accordingly, that scope is intended to be limited only by the scope of the appended claims.

What is claimed is:

1. An air bag assembly comprising:

an inflatable first bag and an inflatable second bag, the second bag located within the first bag, the second bag including a first shield panel and a second shield panel, the second shield panel including notches or openings at its periphery, peripheral portions of the second shield panel sewn to the first shield panel such that the notches or openings in the second shield panel form a plurality of openings in the second bag;

wherein the second shield panel includes a top opening which is smaller than an inflator opening in the first shield panel and wherein the first and second bags, upon assembly, can be inverted when pulled through the top opening in the second shield panel.

2. The air bag assembly as defined in claim 1 wherein the inflator opening is adapted to receive an inflator.

3. The air bag assembly as defined in claim 1 wherein the first and second shield panels are of one-piece construction.

4. An air bag assembly comprising:

an inflatable first bag and an inflatable second bag, the second bag located within the first bag, the second bag including a first shield panel and a second shield panel, the second shield panel including notches or openings at its periphery, peripheral portions of the second shield panel sewn to the first shield panel such that the notches or openings in the second shield panel form a plurality of openings in the second bag; the first shield panel including an inflator opening for operatively receiving an inflator and the second shield panel including a top opening which is smaller than the inflator opening;

wherein the top opening is formed by a central, circular opening in the second shield panel, the second shield panel also including a plurality of slits extending outward from the circular opening.

5. An air bag module assembly comprising:

an inflator having at least one exit port with a thin layer of burst material blocking the at least one exit port, the burst material bursting forth from the exit port during an initial moment of activation of the inflator;

an air bag assembly comprising an inflatable first bag and an inflatable second bag, the second bag located within the first bag, the second bag including an opening to receive the inflator wherein prior to activation of the inflator, opposed portions of the second bag, radially outboard of the inflator, are formed into respective flaps, which are overlapped with one another and positioned on a top of the inflator to provide a tortuous path for any particles including particles of burst material.

6. The module assembly as defined in claim 5 wherein the second bag includes a set of opposed openings which are located in the opposed portions and prior to activation the opposed openings are within the overlapped flaps atop the inflator.

* * * * *